United States Patent [19]

Sikora

[11] 3,720,909
[45] March 13, 1973

[54] DIRECTIONAL HYDROPHONE BUOY SYSTEM
[75] Inventor: Joseph A. Sikora, Jackson, Mich.
[73] Assignee: Spartan Corporation, Jackson, Mich.
[22] Filed: Feb. 1, 1971
[21] Appl. No.: 111,410

[52] U.S. Cl. ................................... 340/8 R, 340/17
[51] Int. Cl. ........................................... H04b 13/00
[58] Field of Search .......... 340/7, 8, 12, 17, 9, 10, 11, 340/13, 2

[56] References Cited

UNITED STATES PATENTS

| | | | |
|---|---|---|---|
| 3,377,615 | 4/1968 | Lutes | 340/2 |
| 3,281,765 | 10/1966 | Taplin | 340/2 |
| 2,435,587 | 2/1948 | Harry | 340/13 R |
| 3,372,368 | 3/1968 | Dale et al. | 340/9 X |
| 3,539,979 | 11/1970 | Crall | 340/17 X |

Primary Examiner—Benjamin A. Borchelt
Assistant Examiner—H. J. Tudor
Attorney—Beaman & Beaman

[57] ABSTRACT

A system for supporting a highly sensitive submerged hydrophone sensing underwater sound pressure waves by physical displacement, primarily in the horizontal direction, wherein the hydrophone comprises a buoyant body maintained in a submerged condition by compliant suspension and anchor means. The displaceable hydrophone is relatively lightweight, increasing sensitivity to sound pressures, and the compliant suspension and anchor means employed include elastic strands having a natural resonance frequency significantly less than the hydrophone operating frequency, and improved sensitivity is achieved due to the low mass and inertia of the hydrophone and adjacent system components.

11 Claims, 6 Drawing Figures

PATENTED MAR 13 1973
3,720,909
SHEET 1 OF 2
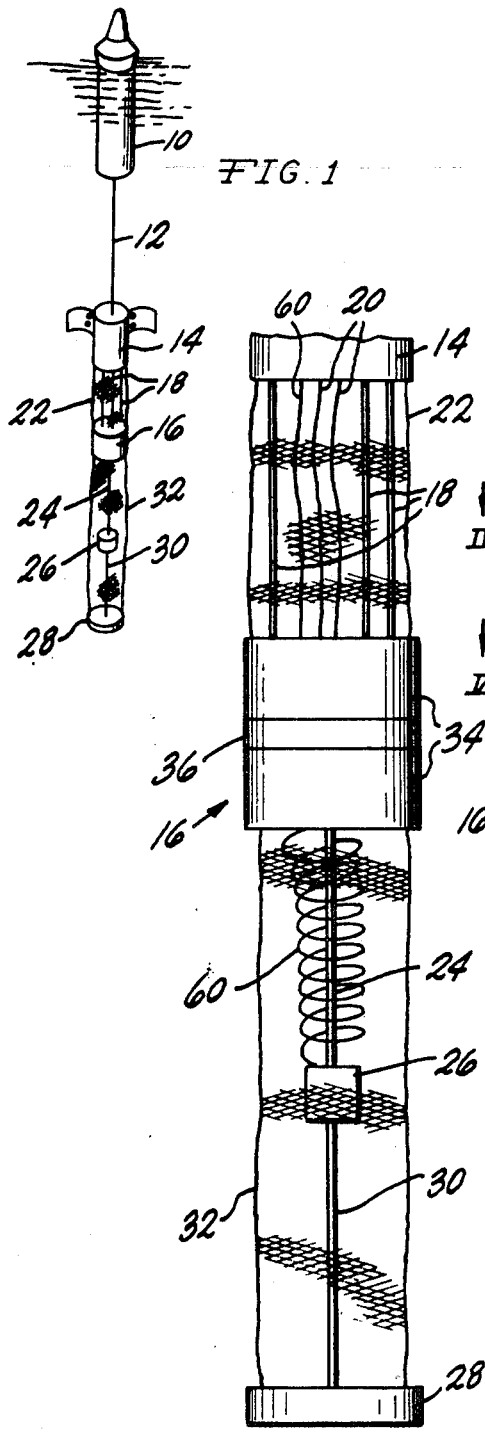
FIG. 1
FIG. 2
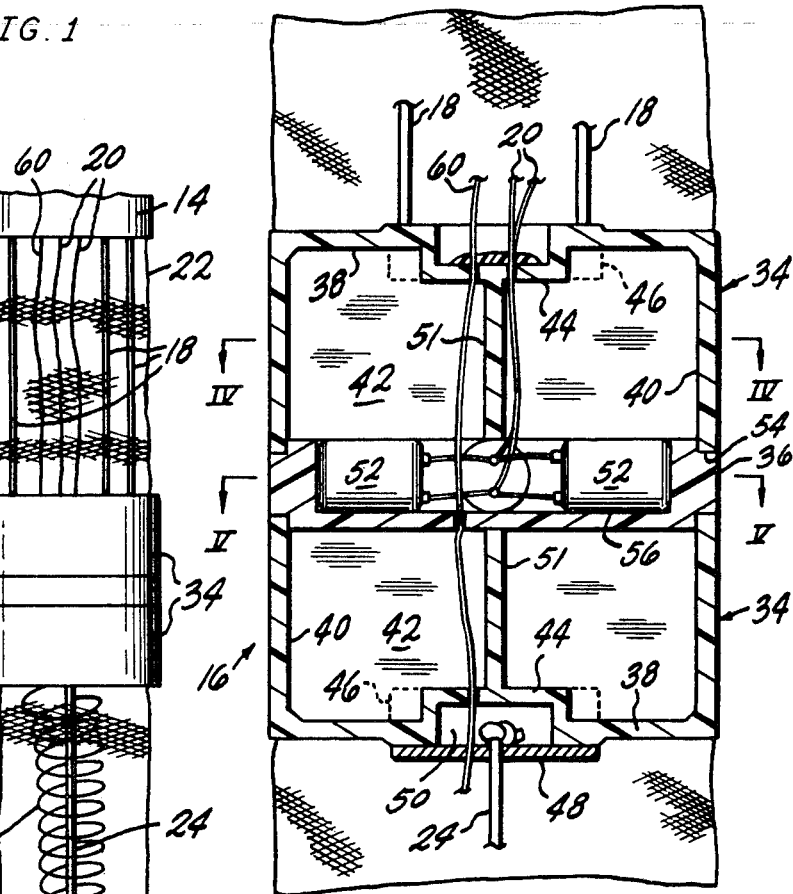
FIG. 3
INVENTOR
JOSEPH A. SIKORA
BY Beaman & Beaman
ATTORNEYS INVENTOR
JOSEPH A. SIKORA
BY Beaman & Beaman
ATTORNEYS

DIRECTIONAL HYDROPHONE BUOY SYSTEM

BACKGROUND OF THE INVENTION

The invention pertains to the field of underwater sound sensing transducers such as hydrophones employing motion detectors producing an electric signal upon physical displacement.

Underwater sound sensing transducers, such as hydrophones and the like, normally employ elements sensitive to sound pressure waves created in the water by a sound source, such as an explosion, propellor, reflected sound source, or the like. Underwater sound sensing devices of the motion detecting type known as seismic geophones have been successfully employed to sense the presence, and direction of underwater sound pressure waves. Such devices are usually of the moving electrical coil type wherein a mass containing a coil winding is suspended by springs in a magnetic field produced by permanent magnets. Movement of the coil within the field produces a voltage output dependent upon the rate at which the coil moves, and by placing the hydrophone within a body displaced by sound waves the magnitude of the sound pressure may be electrically determined by appropriate electric sensing means connected to the hydrophone. Hydrophones of this type are illustrated in U.S. Pat. No. 3,451,040, and seismic directional pickup devices are known as shown in U.S. Pat. No. 2,390,328, seismic type sound detectors are further shown in U.S. Pats. Nos. 2,856,594 and 3,325,778.

As motion detectors used in hydrophones of the aforementioned seismic type sense the presence of sound pressure waves by motion of the coil within the magnetic field, physical displacement of the hydrophone and motion detector is required. Of course, the motion detector must be mounted in an appropriate housing, and as the weight of the housing as well as that of the motion detector constitutes a mass which must be displaced, significant inertial forces must be overcome by the sound pressure wave to produce the displacement to be sensed. Accordingly, the sensitivity of motion detector type hydrophones is adversely affected by the mass of the associated structure, as well as the retardant influences to movement that may be produced by the structure supporting and positioning the hydrophone. For instance, seismic hydrophones may be used for submarine detection purposes wherein the hydrophone is suspended below a free floating buoy, which may also function as a radio transmitter, and the hydrophone is normally suspended below the buoy by a harness or cable system which adds to the mass of the hydrophone and thereby decreases the sensitivity.

SUMMARY OF THE INVENTION

It is an object of the invention to provide a system for supporting a highly sensitive hydrophone from a buoy wherein the hydrophone employs motion detectors of the electrical type and the mass of the hydrophone is minimized in order to produce maximum hydrophone deflection for a given magnitude of sound pressure wave, and wherein the hydrophone supporting structure does not significantly add to the hydrophone mass.

It is a further object of the invention to provide a compliant suspension and anchor means for a hydrophone wherein the apparatus may be compactly packaged, readily deployed and wherein water current induced vibrations are controlled. In the invention the hydrophone is capable of determining the horizontal direction of a sound source and omnidirectional detectors may be employed therewith without affecting the directional sensitivity.

In the practice of the invention the hydrophone body in which the motion detectors are mounted is of a weight less than the weight of the volume of water displaced thereby wherein the hydrophone constitutes a buoyant body. A weight is connected to the hydrophone to overcome the buoyancy of the hydrophone and submerge the same below a buoy from which the hydrophone is suspended, and in this manner the hydrophone is maintained in the desired position and condition. The hydrophone is supported from the buoy by support means, such as cables or the like, and immediately adjacent the hydrophone body the support consists of a compliant elastic assembly formed by a plurality of elastomer elements or strands, such as formed by rubber tubes, which are capable of elongation. The weight is connected to the hydrophone by an elastic anchor means, preferably in the form of an elastomer tube or element or strand disposed immediately adjacent the hydrophone, and in this manner the hydrophone positioning structure immediately above and below the geophone housing consists of elastic elements of little mass capable of elongation under the influence of sound pressure waves imposed upon the hydrophone body.

In particular, the invention is concerned with deflection of the hydrophone in the horizontal direction, and as the elastomer elements are disposed in a vertical direction, only limited elongation is required of the elastomer elements upon horizontal deflection of the hydrophone body, and the hydrophone body movement under the influence of sound pressure is usually of such a character that attendant horizontal displacement of the weight below, or buoy above the hydrophone, does not occur due to elongation of the elastomer elements. Thus, a high sensitivity to sound pressure waves is produced due to the lightweight and low inertial forces of the hydrophone body.

In the disclosed embodiment the hydrophone is of the directional type wherein a plurality of motion detectors are mounted in the hydrophone located perpendicularly to each other as to sense movement in both the X and Y horizontal directions. The seismic motion detectors oriented in a common direction are connected in series in order that the electrical signals produced in a common direction may be added.

Preferably, hydrophone body includes hollow chambers or voids which provide the desired buoyancy, and the mass of the weight associated with hydrophone to maintain it in the submerged condition is preferably only great enough to maintain the hydrophone properly positioned without producing an excessive tension within the elastic anchor element.

In order to prevent interference between resonance frequencies produced in the elastic elements with the sensing of sound pressures the frequency of resonance of the elastic elements directly associated with the hydrophone body are significantly less than the frequencies to be sensed by the hydrophone motion detectors, and in order to minimize the imposing of vibrations on the geophone from water currents acting on the elastic elements to produce strumming due to alternate vortex shedding as a result of a differential water current acting on the elastic elements shielding and water current control means in the form of a mesh is disposed about the elements. Additionally, the shell or body of the hydrophone is preferably reinforced and stiffened by means of partitions in order to minimize the likelihood of resonance frequencies occurring within the hydrophone body itself which would adversely affect the desired sensitivity.

BRIEF DESCRIPTION OF THE DRAWINGS

The aforementioned objects of the invention will be best understood and appreciated from the following description and accompanying drawings wherein:

FIG. 1 is a view of a typical directional hydrophone buoy system in accord with the invention illustrating the components in the fully deployed operational condition, FIG. 2 is an enlarged, detail, elevational view of the lower portion of the system in accord with the invention illustrating those components immediately above and below the hydrophone housing, FIG. 3 is an enlarged, detail, elevational, sectional view of the hydrophone housing.

DESCRIPTION OF THE PREFERRED EMBODIMENT

Figure 4:
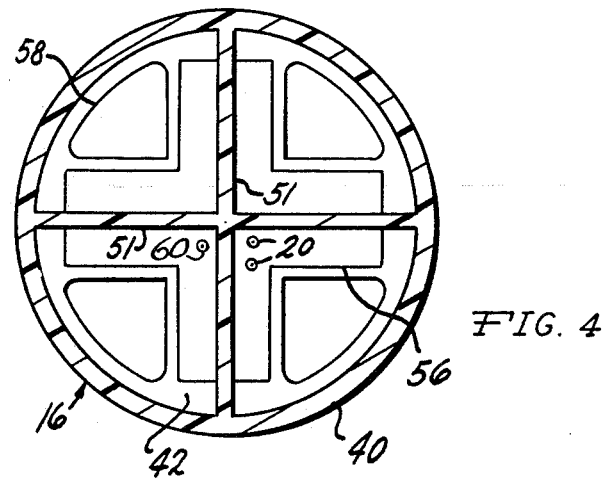
FIG. 4 is a plan, elevational, sectional view of the hydrophone housing taken along Section IV—IV of FIG. 4.

The inventive concepts may be employed in a variety of applications and installations wherein subsurface sound is to be detected by sensing the sound pressure waves. Such uses of submerged hydrophones are well known, and as the instant invention was particularly designed for, but not limited to, use with sonobuoy systems used for the detection of submarines and submerged bodies, the inventive concepts will be described in this type of installation.

In sonobuoy use, the deployed assembly may take a form such as shown in FIG. 1 wherein a free floating buoy 10 supports all of the components and comprises a cannister in which a radio transmitter is located for transmitting signals received from the sound pickup apparatus to aircraft, watercraft or other receivers wherein the transmitted signals are processed for informational purposes. A suspension member 12 extends from and below the buoy 10, and this suspension may be of the compliant type shown in the assignee's U.S. Pat. No. 3,377,615, or may be noncompliant, if consisting of a nonelongated cable or the like. Damping means may be mounted upon the suspension member 12, not shown, for damping vertical movement of the entire assembly.

In the disclosed embodiment the supporting body for the hydrophone housing is in the form of a subsurface housing or casing 14 which may include stabilizing fins extending therefrom. The casing 14 is affixed to the lower end of the suspension member 12 and may be of a cylindrical configuration having a vertically disposed axis under normal deployed conditions. Electronic apparatus for processing the output of the hydrophone motion detectors is located within the casing 14 and this apparatus may include the basic electronic components disclosed in assignee's U.S. Pat. No. 3,444,508 directed to a directional sonar system. This electronic apparatus includes amplifiers and the like for transmitting signals to the radio transmitter buoy 10, and a directional compass is included within the casing, and appropriately associated with the electronic apparatus for relating the received signals to direction. In the disclosed embodiment the sonobuoy is passive and sonic signals are not generated for detection purposes. The particular electronics and circuitry mounted within the casing 14 form no part of the invention and are considered to be within the scope of those skilled in the art.

The hydrophone body or housing 16 is suspended below the subsurface body or casing 14 by means of an elastic compliant suspension assembly consisting of three elastomer elements or strands 18 affixed to and extending from the underside of the casing 14, and attached to the upper end of the hydrophone body 16. The elements 18 are preferably formed of silicone rubber tubing, or similar material, capable of resilient elongation in a vertical direction, and the elements are attached to the housing 16 at 120° locations with respect to each other about the hydrophone housing vertical axis. By employing three elements 18, a predetermined angular orientation between the supporting casing 14 and the hydrophone housing 16, is maintained about the vertical axis of the hydrophone housing and support body, which is necessary in view of the direction sensing capabilities of the hydrophone, which must be angularly oriented to the compass means within the body 14 in a known manner.

Electrical interconnection between the casing 14 and the hydrophone housing 16 exists through slack coaxial conductors 20 and 60, and the three elastomer elements 18 are encompassed within a cylindrical mesh sleeve 22 which may be formed of synthetic filaments which shield the elements 18 from the effect of water currents passing over these strands which would produce strumming or vibration of the elements by the water current due to alternate vortex shedding, which adversely affect the hydrophone sensitivity and output.

It is desired that the hydrophone housing 16 be of as light a weight as possible to reduce the mass thereof, and therefore reduce the magnitude of sound pressure waves necessary to cause hydrophone displacement. As will be later described the hydrophone housing includes chambers or voids which impart to the hydrophone housing a density less than that of the ambient water wherein the hydrophone housing 16 constitutes a buoyant body when in use.

In view of the buoyancy of the hydrophone housing 16 anchoring means are associated with the hydrophone housing to maintain the desired position thereof during deployment and operation, and such anchoring means takes the form in the illustrated embodiment of a single elastic elastomer element or strand 24 extending from and below the lower end of the hydrophone housing. The element 24 is preferably formed of a silicone rubber tube, as in the manner of the elements 18, and in the disclosed embodiment an omnidirectional hydrophone 26 is connected to the lower end of the element 24 for the omnidirectional reception and sensing of sound pressure waves. The hydrophone 26 forms no part of the instant invention, and its presence or elimination with respect to the basic inventive concepts is optional.

A weight 28 depends from the hydrophone 26, and is connected thereto by a noncompliant suspension cable 30. The weight 28 may be of any high density material, such as lead or steel, and in those embodiments wherein an omnidirectional hydrophone 26 is connected to the weight 28, the mass of the hydrophone is considered to constitute a portion of the total weight supported by the anchor suspension element 24. A mesh sleeve 32 of synthetic filament material encompasses the anchor element 24, the hydrophone 26, and the noncompliant suspension cable 30 to prevent water currents from producing a strumming or vibration of the elastic anchor element 24, for the same reasons as set forth above with respect to the mesh sleeve 22.

The total weight imposed upon the anchor means element 24 is greater than the buoyancy of the hydrophone housing 16, and thus a tension will be maintained within the suspension assembly elements 18. While the total weight imposed upon the anchor element 24 is greater than the buoyancy of the hydrophone housing 16, it is desirable that this total weight not greatly exceed the buoyancy of the hydrophone housing. The weight imposed upon the anchor element 24 should be great enough to maintain sufficient tension within the elements 18 to insure that the desired predetermined angular relationship between the hydrophone housing and the casing 14 be maintained, and the weight should also be great enough to insure that the hydrophone housing 16 be maintained in a vertical manner during normal conditions. Thus, the magnitude of the weight imposed on the anchor element 24 overcomes the buoyancy effect of the hydrophone housing, but is not such to significantly elongate the elastomer elements 18 and 24 wherein, during deployment and operation of the system, the elastomer elements do not approach their maximum extent of elongation and remain in a fully elastic or compliant condition during operation.

Figure 5:
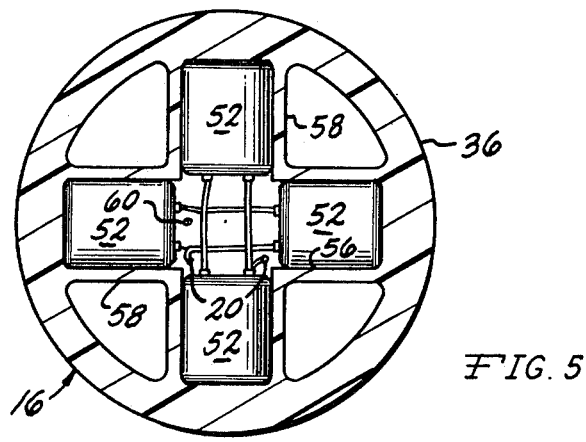
FIG. 5 is a plan, sectional view taken through the central region of the hydrophone housing body illustrating the motion detectors as taken along Section V—V of FIG. 3, the potting compound not being illustrated.

The construction of the geophone housing 16 is best appreciated from FIGS. 3 through 5. In the disclosed embodiment the hydrophone housing consists of two substantially identical end portions 34 and a central portion, all formed of a lightweight, rigid, synthetic material, asbestos filled phenolic resin being the material employed in one embodiment of the invention.

The end portions 34 of the housing 16 form hollow shells of an exterior cylindrical configuration. End walls 38 close one end of the side wall 40, and the side walls 40 are of a relatively thin dimension to define a chamber 42 therebetween. The end walls 38 are provided with a central thickened boss portion 44 which may be recessed and drilled for receiving electrical conductors 20 which extend therethrough, and sealing means associated with the holes through which the conductors extend seal the interior of the hydrophone housing. Internal bosses 46, FIG. 3, are also defined on the interior of the end walls 38 at 120° intervals about the boss 144 for the purpose of permitting blind holes to be drilled in the end wall for attaching elements 18 thereto. The anchor means element 24 extends through a hole in a plate 48 affixed to the lower end wall 38 and a knot or other fastening means within recess 50 affixes the element 24 to the housing 16.

In order to "stiffen" the hollow end portions 34 diametrical partitions 51, FIGS. 3 and 4, are integrally molded in the end portions extending thereacross to strengthen the side walls 40 and minimize the likelihood of vibration or resonance occurring within the housing end portions of a frequency which may adversely affect the hydrophone output.

The motion detectors 52 associated with the hydrophone housing 16 are located within the central portion 36 of the housing, and the central portion is of a disk-like configuration having an outer cylindrical form including shoulders 54 which receive the open ends of the end portions 34 as will be appreciated in FIG. 3. During assembly, the end portions and central portion are bonded together to produce a fluid-tight assembly.

Internally, the central portion 36 is recessed at 56, FIG. 5, in a cross-type configuration to receive the motion detectors 52. Also, voids 58 are defined in the central portion establishing communication between the chambers 42 of the end portions.

Four seismic motion detectors 52 are received and potted within the recess 50 and oriented in the manner apparent in FIG. 5 wherein the detector terminals are disposed toward the housing axis. The motion detectors 52 are preferably of the moving coil type wherein a mass containing a coil winding is suspended by springs in a magnetic field produced by permanent magnets. The motion of the coil within the magnetic field produces a voltage output dependent upon the rate at which the coil moves. This type of motion detector is known, and reference is made to U.S. Pat. No. 3,451,040 which discloses an example thereof. As will be appreciated in FIGS. 5 and 6 the motion detectors are arranged in pairs such that the axis thereof of two of the detectors is coaxial and defines a diameter of the hydrophone housing. The axis of the other two motion detectors is perpendicularly disposed to the axis of the first mentioned pair of detectors, and thus by the utilization of two pair of motion detectors deflection of the hydrophone housing in the horizontal X and Y directions may be determined, and differentiated. As will be appreciated in FIG. 3, the motion detectors are so oriented that the axes thereof lie in a horizontal plane, as determined by the suspension from support casing 14.

Figure 6:
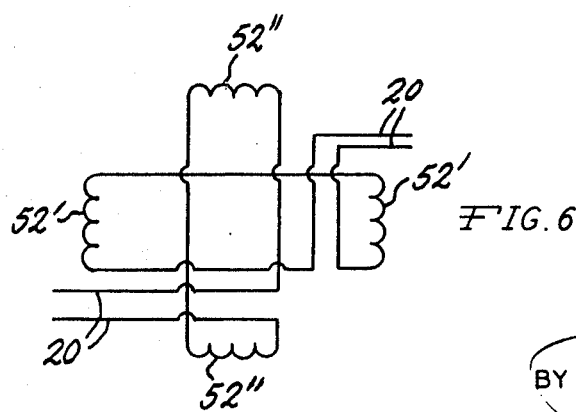
FIG. 6 is a diagram illustrating the electrical interconnection of the motion detectors of the hydrophone system in accord with the invention.

Coaxial electrical conductors interconnect the coils of coaxially aligned pairs of motion detectors 52 in series, see FIG. 6, wherein the voltages generated by the coils 52' in the X direction are added, and the voltages generated by the coils 52'' in the Y direction are added. Thus, by employing pairs of serially interconnected motion detectors sensitivity is increased, and conductors 20 extend from the motion detectors through the upper end wall 38 to the processing circuit contained in the support casing 14.

Electrical conductor 60, which may also be of the coaxial type, extends between the omnidirectional hydrophone 26 through the hydrophone housing 16, as illustrated in FIG. 3, and to the support casing 14, for processing of the omnidirectional signals received by the hydrophone.

Seismic transducers of the type shown in U.S. Pat. No. 3,451,040 are normally intended to operate approximately about their frequency of resonance. Preferably, in the instant invention the motion detectors 52 operate below resonance in the linear low frequency range. Of course, the motion detectors employed with the hydrophone housing 16 will have a sensitivity range within the frequency band of interest in order to detect sound pressures of frequencies for which the apparatus is particularly designed, and in order to insure that the hydrophone housing is not subjected to resonance vibrations created by the elastic suspension thereof, the elastic suspension disposed above the housing 16 consisting of the elements 18, and the elastic anchor means element 24, are balanced such that their frequencies of resonance are substantially equal, and the resonance frequency is very low as compared with the frequency band of interest to be sensed by the motion detectors. For instance, the resonance frequency of the upper compliant suspension assembly as defined by elements 18, and the anchor element 24, may be one-tenth of the lowest frequency of the band of interest. Thus, the elastic elements connected to the hydrophone housing, themselves, will produce a relatively stable means for positioning the hydrophone housing without imposing extraneous vibrations upon the housing. Also, by the use of the mesh sleeves 22 and 32 the tendency for vibrations to be generated in the elastic elements is reduced.

Sound pressure waves occurring in the water will engage the hydrophone housing 16 and horizontally displace the same in a direction determined by the direction of movement of the sound pressure. As the deflection of the hydrophone housing causes a deflection of the coils of the motion detectors 52 contained therein, the horizontal X and Y components of the deflection are sensed, and voltages are produced in both directions proportional to the magnitude of deflection. The greater the magnitude of physical displacement of the hydrophone housing by the sound pressure, the greater will be the voltage output produced by the motion detectors, and hence the greater the sensitivity. As the hydrophone housing of the invention is of a relatively light weight, the resistance to displacement by sound pressure waves to produce displacement is reduced in that minimum inertia forces and mass need be overcome. The presence of the elastic elements 18, and the elastic anchor element 24 adds very little mass to the hydrophone housing which is to be deflected, and due to the elastic nature of the elements 18 and 24 the support casing 14 and the weight 28, including the omnidirection hydrophone 26 will not be displaced upon displacement of housing 16. Additionally, the elastic suspension and weighting of the hydrophone housing minimizes the influence of vibrations being transmitted from the support casing 14 and weight 28 to the hydrophone housing.

As discussed above, the mass of the weight applied to the anchor element 24 overcomes the buoyancy of the hydrophone housing 16, and it will be appreciated that the chambers 42 of the hydrophone housing are of sufficient volume to provide the desired buoyancy. The buoyant nature of the hydrophone housing permits the tension within the elements 18 and 24 to be accurately controlled by the mass of the weight imposed upon the anchor element, and thus only enough weight need be applied to hydrophone housing to maintain it in the desired operating position, as described above.

Test results have indicated that the above described system provides increased sensitivity over known constructions of seismic hydrophones, and it is appreciated that various modifications to the disclosed embodiment may be apparent to those skilled in the art without departing from the spirit and scope of the invention.

I claim:

1. A system for supporting a submerged hydrophone for displacement by sound pressure comprising, in combination, a supporting body, an elastic suspension assembly connected to said supporting body and depending therebelow, a lightweight hydrophone capable of sensing sound upon being displaced by sound pressure connected to and supported by said suspension assembly, said hydrophone having a weight less than that of the volume of water displaced thereby constituting a buoyant body, elastic anchoring means connected to and depending below said hydrophone, and a weight connected to said elastic anchoring means of sufficient mass to overcome the buoyancy of said hydrophone, said elastic suspension assembly and anchoring means permitting deflection of said hydrophone by sound pressure without significant deflection of said supporting body and weight.

2. In a system for supporting a submerged hydrophone as in claim 1 wherein said elastic suspension assembly includes means maintaining a predetermined angular relationship between said supporting body and said hydrophone about a vertical axis passing through said supporting body and said hydrophone.

3. In a system for supporting a submerged hydrophone as in claim 1 wherein the frequency of resonance of said suspension assembly is substantially equal to the frequency of resonance of said elastic anchoring means.

4. In a system for supporting a submerged hydrophone as in claim 3 wherein the frequency of resonance of said suspension assembly and said elastic anchoring means is substantially less than the lowest frequency of interest of said hydrophone.

5. In a system for supporting a submerged hydrophone as in claim 1 wherein said elastic suspension assembly and said elastic anchoring means comprise elongated elastomer elements.

6. In a system for supporting a submerged hydrophone as in claim 5, porous water current shielding means disposed about said elastomer elements to minimize water current induced vibration thereof.

7. A system for supporting a submerged directional hydrophone capable of determining the horizontal direction of origin of sound pressure waves comprising, in combination, a supporting body, an elastic suspension assembly connected to said supporting body and vertically depending therebelow, a lightweight hydrophone connected to and supported by said suspension assembly, said hydrophone including a first motion detector having a substantially horizontal direction of sensing movement and a second motion detector having a substantially horizontal direction of sensing movement perpendicular to the direction of sensing movement of said first detector, said hydrophone having a weight less than that of the volume of water displaced thereby constituting a buoyant body, vertically disposed elastic anchoring means connected to and depending below said hydrophone, and a weight connected to said elastic anchoring means of sufficient mass to overcome the buoyancy of said hydrophone, said elastic suspension assembly and anchoring means permitting horizontal deflection of said hydrophone under the influence of sound pressure waves without significant deflection of said supporting body and weight.

8. In a system for supporting a submerged directional hydrophone as in claim 7 wherein said elastic suspension system comprises at least three elastomer elements interposed between said supporting body and said hydrophone maintaining a predetermined angular relationship between said supporting body and said hydrophone about a vertical axis passing therethrough.

9. In a system for supporting a submerged hydrophone as in claim 8 wherein said anchoring means comprises a vertically extending elastomer element, the frequency of resonance of said suspension assembly and said anchoring means being substantially equal and substantially less than the lowest frequency of interest of said motion detectors.

10. In a system for supporting a submerged hydrophone as in claim 8 wherein said hydrophone includes a pair of said first motion detectors coaxially aligned in a horizontal direction and a pair of said second motion detectors coaxially aligned in a horizontal direction perpendicular to the axis of said first detectors, electrical conductors interconnecting said first detectors in series and electrical conductors connecting said second detectors in series.

11. In a system for supporting a submerged hydrophone as in claim 8 wherein said hydrophone comprises an elongated body having a vertical axis, said body including end portions and a central portion, hollow chambers defined in said elongated body adjacent said end portions for producing buoyancy of said hydrophone, said motion detectors being mounted within said central portion intermediate said hollow chambers.

* * * * *